(12) United States Patent
Ananda

(10) Patent No.: US 6,931,549 B1
(45) Date of Patent: Aug. 16, 2005

(54) METHOD AND APPARATUS FOR SECURE DATA STORAGE AND RETRIEVAL

(75) Inventor: Mohan Ananda, Westlake Village, CA (US)

(73) Assignee: Stamps.Com, Santa Monica, CA (US)

(*) Notice: Subject to any disclaimer, the term of this patent is extended or adjusted under 35 U.S.C. 154(b) by 0 days.

(21) Appl. No.: 09/579,079

(22) Filed: May 25, 2000

(51) Int. Cl.$^7$ .............................................. G06L 11/30
(52) U.S. Cl. ................... 713/201; 713/200; 713/150; 713/155; 713/161; 713/169; 713/170; 713/171; 713/176; 713/175; 713/178
(58) Field of Search ................................. 713/200–201, 713/150, 155, 161, 169, 170, 171, 176, 175, 178

(56) References Cited

U.S. PATENT DOCUMENTS

| | | |
|---|---|---|
| 4,831,555 A | 5/1989 | Sansone et al. |
| 4,900,903 A | 2/1990 | Wright et al. |
| 4,900,904 A | 2/1990 | Wright et al. |
| 4,908,770 A | 3/1990 | Breault et al. |
| 5,111,030 A | 5/1992 | Brasington et al. |
| 5,136,647 A | 8/1992 | Haber et al. |
| 5,150,407 A | 9/1992 | Chan |
| 5,289,540 A | 2/1994 | Jones |
| 5,339,361 A | 8/1994 | Schwalm et al. |
| 5,454,038 A | 9/1995 | Cordery et al. |
| 5,455,953 A | 10/1995 | Russell |
| 5,475,757 A | 12/1995 | Kelly |
| 5,495,533 A * | 2/1996 | Linehan et al. .............. 713/155 |
| 5,615,268 A | 3/1997 | Bisbee et al. |
| 5,619,571 A | 4/1997 | Sandstrom et al. |
| 5,621,795 A | 4/1997 | Baker et al. |
| 5,623,546 A | 4/1997 | Hardy et al. |
| 5,636,280 A * | 6/1997 | Kelly .......................... 713/155 |
| 5,727,156 A | 3/1998 | Herr-Hoyman et al. |
| 5,732,137 A | 3/1998 | Aziz |
| 5,732,219 A | 3/1998 | Blumer et al. |
| 5,748,735 A | 5/1998 | Ganesan |
| 5,748,738 A | 5/1998 | Bisbee et al. |
| 5,751,812 A | 5/1998 | Anderson |
| 5,757,925 A | 5/1998 | Faybishenko |
| 5,790,977 A | 8/1998 | Ezekiel |
| 5,825,890 A | 10/1998 | Elgamal et al. |
| 5,841,871 A | 11/1998 | Pinkas |
| 6,148,404 A * | 11/2000 | Yatsukawa ................... 713/200 |
| 6,189,096 B1 * | 2/2001 | Haverty ....................... 713/155 |
| 6,424,718 B1 * | 7/2002 | Holloway .................... 380/277 |
| 6,530,023 B1 * | 3/2003 | Nissl et al. ................... 713/200 |

* cited by examiner

Primary Examiner—Gregory Morse
Assistant Examiner—Tongoc Tran
(74) Attorney, Agent, or Firm—The Hecker Law Group, PLC

(57) ABSTRACT

A method and system for secure real time storage and retrieval of data by a first computer with the aid of a second computer via a secure communication link between the first and second computers. The method and system enable a user at the remote first computer to secure a data file for storage by connecting to the second computer and by exchanging certain parameters between the two computers. The method and system also enable the user at the first computer to retrieve the stored secure data file by connecting to the second computer and by exchanging certain parameters between the two computers.

21 Claims, 8 Drawing Sheets

METHOD AND APPARATUS FOR SECURE DATA STORAGE AND RETRIEVAL

BACKGROUND OF THE INVENTION

1. Field of the Invention

This invention relates in general to the field of data security, and more particularly to data encoding/decoding in a network.

2. Background Art

Data security is of extreme importance to all entities utilizing data processing and computing systems. As such, various data security systems are utilized to prevent unauthorized access to stored digital information. Generally, data is stored either in a central facility in a network environment, or in local computer systems' storage in a distributed environment. In either case extreme care is required to protect the data from access by intruders. Unauthorized access to the stored data can be initiated from external sources as well as internal sources without authorization to access the data, leading to copying or loss of valuable data.

With the proliferation of easily accessible networks such as the Internet, the security threat becomes much more serious to said entities as many of their computers can be accessed by outside computers through the Internet. There are sophisticated "firewall" systems that can detect any unauthorized attempt of intrusion to a particular computing system or a network of computers, and attempt to prevent unauthorized entry into the computing system. However, in many instances unauthorized intrusion into secured computing systems takes place despite the firewall systems, and valuable information lost or stolen from the computing systems.

Therefore, there have been attempts at developing systems that virtually eliminate any loss of information even in case of unauthorized intrusion into a computing system. One such system is disclosed in U.S. Pat. No. 5,136,647 issued to Stuart Harber and Wakefield Stornetta Jr. on Aug. 4, 1992, directed to a system for time-stamping a digital document. The time stamping protects the secrecy of the document text and provides a tamper proof time scale establishing an author's claim to the temporal existence of the document. The objective is to incorporate the content of the document by utilizing a one-way hash function and a time stamp into the digital data itself so that it is not possible to change any bit of the resulting time-stamp data without such a change being apparent. The author of the document does not generate the time stamping, instead the services of an independent agent are used for time stamping. A digital signature procedure is also employed by the independent agent to deter the incorporation of a false time statement. The system is primarily directed to address the need to establish the date on which a document was created and to prove that the text of a document in question is in fact is same as that of the original dated document. The system enables the detection of any alteration of the content of the digital document by examining the hash function, the time stamp and digital signature associated with the document.

Another prior art system, disclosed in U.S. Pat. No. 5,150,407 issued to Steve Chan on Sep. 22, 1992, is directed to a secured data storage device including a secured portion and a medium portion. The secured portion is a physically secured enclosure with very limited access from outside sources. The medium portion includes a conventional storage medium such as a hard disk or a floppy disk. In this system, data encoding is accomplished by utilizing an encryption algorithm and the associated key is separated into two parts, wherein the first part is stored in the secured portion of the storage device and the second part is stored in the medium portion of the storage device. This system also uses a time stamping procedure along with the encryption of the data without using an independent agent.

A further prior art system, disclosed in U.S. Pat. No. 5,289,540 issued to Richard Jones on Feb. 22, 1994, is directed to a computer file protection system. The system includes both hardware and software elements and the protection process operates by intercepting the file system data path between a central processing unit and a file storage or memory device. The system also includes a programmable auxiliary memory and auxiliary control unit.

Another prior art system, disclosed in U.S. Pat. No. 5,619,571 issued to Brent Sandstorm, et al., on Apr. 8, 1997, is directed to a system for securely storing electronic records. In this system, a data stream image identification code and time data provided by a trusted source are combined to generate a key. The image identification code and time data are stored in a public directory and a verification code is generated from the data stream. This verification code is placed in a private area that is encrypted by the key generated by the method described earlier.

Another prior art system, disclosed in U.S. Pat. No. 5,623,546 issued to Douglas Hardy, et al., on Apr. 22, 1997, is directed to an encryption method and system for portable data, wherein portable encrypted data can be accessed through multiple hosts. A split key encryption system encrypts data and stores that data on a portable device. One split of the portable key is stored in the portable device, and another split of the key is stored in the home host.

However, the above conventional systems do not address the problem of securing the stored data from intruder access, require special hardware for the secured portion of the storage device and do not support a client-server architecture.

SUMMARY OF THE INVENTION

The present invention provides a method and system for securely storing data locally or in a central facility such that only properly authorized and authenticated persons can retrieve such stored data. For example, users may use one embodiment of the present invention to store data in encrypted form by executing a save as encrypted command. Once the date is encrypted it may be decrypted and retrieved by executing a retrieve data command. The present invention provides a way to preserve the integrity and authenticity of the stored data such that no unauthorized alteration to the content of the data or the time at which the data was originally generated takes place. The present invention generates a record of the history of the data storage and retrieval operations to facilitate auditing functions for use of such data.

In one embodiment, the present invention provides a method for authorized users to securely store and retrieve data files in a network system, whereby a user can encode data for storage and later retrieve and decrypt the data for use. The network system comprises a server computer system interconnected to a client computer system via a communication link. The method of securing access to data comprises generating identifying information that represents the data at the client computer system. The identifying information may be transmitted to the server computer system when an event occurs. The computer system receives the identifying information and utilizes it to generate a key pair corresponding to the identifying information. The key pair typically includes an encode key and a decode key for encoding and decoding of the data. In one or more embodiments of the invention the server computer system stores the key pair and the identifying information for later use. The server may then transmit the encode key to the client computer system. When the client computer system receives the encode key it utilizes it to encode the data. The invention also contemplates transmitting the decode key to the client computer system upon requests.

Secure Save:

In one example implementation the client and server computer systems interact with one another. For example, the client computer system may generate a client message file comprising information that represents the data. The client message file is transmitted to the server computer system; and utilized to generate a key pair including an encode key for encoding the data and a decode key for decoding the encoded data. The server computer then stores the key pair and information from the client message file. In one or more embodiments of the invention the server generates a server message file that comprises the encode key and transmits the server message file to the client computer system. The client computer system may then encode data using the encode key in the server message file. Once the data is encoded it is stored for later use.

Retrieve Data:

Thereafter, to provide access to encoded data, the client and server computer systems continue to interact. For example, the client computer generates a client message file. The client message file may comprise information representing the data that is to be stored. The client message file is transmitted to the server computer and utilized by the server to retrieve information including a decode key for decoding the encoded data. One embodiment of the invention contemplates generating a server message file including the decode key, and transmitting the server message file to the client computer system. When the client computer receives the server message it accesses the encoded data, and may decode the data using the decode key in the server message file.

The client and server message files can further include time stamps and authentication information for the data. As such, the integrity and authenticity of the stored data are preserved wherein no unauthorized alteration to the content of the data or the time at which the data was originally generated takes place. Further, using the time stamp information, a record of the history of the data storage and retrieval operations can be generated to facilitate auditing functions for use of such data.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
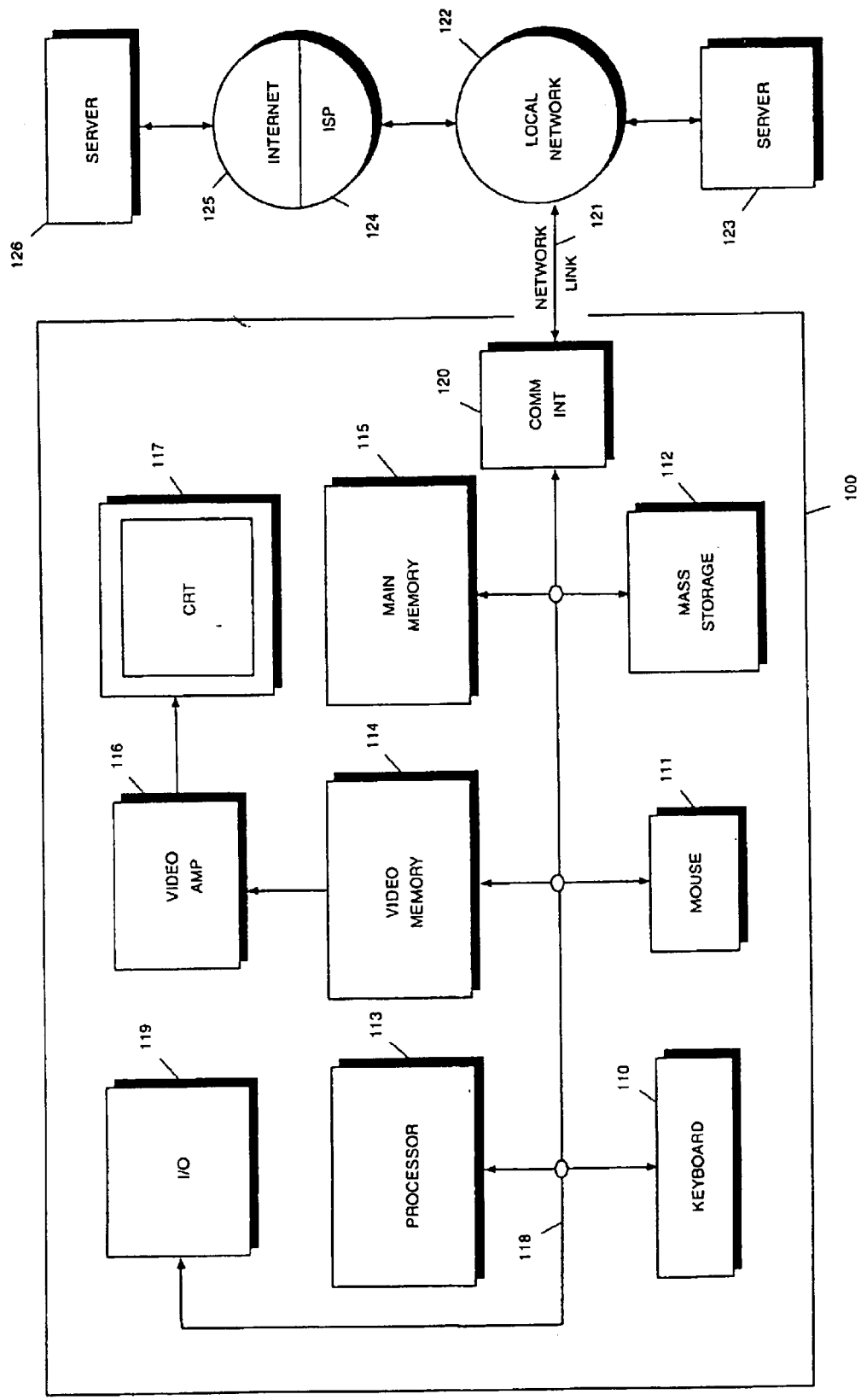
FIG. 1 shows an example block diagram of a network system in which the present invention can be implemented.

In one embodiment, the present invention provides a system for secure real time storage and retrieval of data by a first computer with the aid of a second computer via communication link between the first and second computers. In one or more embodiments of the invention, the communication link is secure. However the invention also contemplates the use of insecure communication links. The system enables a user at the remote first computer to secure a data file for storage by connecting to the second computer and by exchanging certain parameters between the two computers. The system also enables the user at the first computer to retrieve the stored secure data file by connecting to the second computer and by exchanging certain parameters between the two computers.

In one embodiment, the present invention comprises: (1) a secure data storage and retrieval module that can be downloaded to the first computer from the second computer by the first computer and executed on the first computer, and (2) an enabling module that may be executed on the second computer while the first and the second computers maintain a communication link to one another. Communication between the first computer and second computer may utilize data encryption to preserve the security and integrity of the data transferred between the two computers. The user utilizes the first computer to register with the second computer and establish a personal identity (e.g. a password). Once an identity is established, the user is then able to secure and store a data file by executing a secure save command that is made available by the secure data storage and retrieval module residing at the first computer.

Secure Save Command:

After initiating the secure save command, the first computer transmits the file name, an identification parameter of the first computer and the personal identification information to the second computer. The second computer, after processing the received information and after proper authentication of the first computer, generates a time stamp, a digital signature that is a function of the time, the file name, the identification parameter and the password, and a key pair including both encryption and decryption keys. The second computer stores such received and generated information in its database and transmits the file name, the time stamp, the digital signature and the encryption key to the first computer. The first computer encrypts the data file using the received encryption key and stores the encrypted data file along with the time stamp and the digital signature using the file name.

Retrieve Data Command:

Thereafter, the user can retrieve the data file from secure storage by using a retrieve data command made available in the secure data storage and retrieval module in the first computer. By initiating the retrieve data command, the first computer transmits the file name, the identification parameter of the first computer, and the personal identification information (e.g. password) along with the time stamp and the digital signature to the second computer. The second computer, after processing the received parameters retrieves the stored data from its database and compares the data with the received data. After proper validation, the second computer transmits the file name and the decryption key to the first computer. The first computer may then access and decrypt the encrypted data file using the decryption key.

FIG. 1 shows a block diagram of an example embodiment of a network 100 including one or more client computer systems 101 interconnected to one or more server computer systems 130, in which the present invention can be implemented. Computer system 101 includes a bus 102 or other communication mechanism for communicating information, and a processor (CPU) 104 coupled with the bus 102 for processing information. Computer system 101 also includes a main memory 106, such as a random access memory (RAM) or other dynamic storage device, coupled to the bus 102 for storing information add instructions to be executed by the processor 104. The main memory 106 also may be used for storing temporary variables or other intermediate information during execution or instructions to be executed by the processor 104.

The computer system 101 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

In one embodiment, the CPU 104 comprises a microprocessor manufactured by Motorola(R), such as the 680×0 processor or a microprocessor manufactured by Intel(R), such as the 80×86, or Pentium(R) processor, or a SPARC(R) microprocessor from Sun Microsystems(R). However, any other suitable microprocessor or microcomputer may be utilized. The main memory 106 can comprise dynamic random access memory (DRAM). And video memory (not shown) can comprise a dual-ported video random access memory.

The computer system 101 may be coupled via the bus 102 to a display 112, such as a cathode ray tube (CRT), for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112. This input device typically has two degrees of freedom in two axes, a first axis (e.g., x) and a second axis (e.g., y) that allows the device to specify positions in a plane.

According to one embodiment of the invention, the steps of the processes of the present invention is provided by the computer system 101 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also execute the sequences of instructions contained in the main memory 106. In one embodiment of the invention, hard-wired circuitry may be used in place of or in combination with software instructions to implement the invention. Thus, embodiments of the invention are not limited to any specific combination of hardware circuitry and software.

The term computer-readable medium as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the computer system 101 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The computer system 101 also includes a communication interface 118 coupled to bus the 102. The communication interface 118 provides a two-way data communication coupling to a network link 120 that is connected to a local network 122. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider ISP) 126. The ISP 126 in turn provides data communication services through the world wide packet data communication network now commonly referred to as the Internet 128. The local network 122 and the Internet 128 both use electrical, electromagnetic or optical signals that carry digital data streams. The signals through the various networks and the signals on the network link 120 and through the communication interface 118, which carry the digital data to and from the computer system 101, are exemplary forms or carrier waves transporting the information.

The computer system 101 can send messages and receive data, including program code, through the network(s), the network link 120 and the communication interface 118. In the Internet example, a server 130 might transmit a requested code for an application program through the Internet 128, the ISP 126, the local network 122 and the communication interface 118. Each of the servers 130 can comprise one or more computer systems such as the computer systems 101 therein.

The communication interface 118 can comprise a USB/Tuner and the network link 120 may be an antenna or cable for connecting the computer system 101 to a cable provider, satellite provider or other terrestrial transmission system for receiving messages, data and program code from another source.

The received code may be executed by the processor 104 as it is received, and/or stored in the storage device 110, or other non-volatile storage for later execution. In this manner, the computer system 101 may obtain application code in the form of a carrier wave.

The example versions of the invention described herein are implemented as logical operations in a distributed processing system such as the network system 100 including client and server computing systems 101 and 130, respectively. The logical operations of the present invention can be implemented as a sequence of steps executing on the computing network 100, and as interconnected machine modules within the computing network 100. The implementation is a matter of choice and can depend on performance of the network 100 implementing the invention. As such, the logical operations constituting said example versions of the invention are referred to for e.g. as operations, steps or modules.

In one or more embodiments of the invention the communication link between a client computer system 101 and a server 130 comprises a secure communication medium. For example, in one embodiment the present invention is directed to a secure real time data storage and retrieval system comprising the client-server architecture of the network 100 (FIG. 1), wherein a secured communication medium is maintained between the client computer 101 and the server computer 130. A user at the client computer 101 is provided with functions including secure data storage and data retrieval, wherein enabling functions are performed on the server computer 130 while the client computer 101 and the server computer 130 maintain a secure communication link to one another.

Security and authenticity of the information communicated among the computer systems 101, 130 can be maintained using different authentication protocols. In one example wherein the communication medium comprises the Internet, security for information exchanged over the Internet is accomplished utilizing a software layer such as built in features of the known secure sockets layer (SSL) Internet communication protocol. A cryptographic hardware device can also be incorporated in the server computer system 130 to ensure authenticity and security of the information exchanged between the client computer 101 and the server computer 130.

Figure 2:
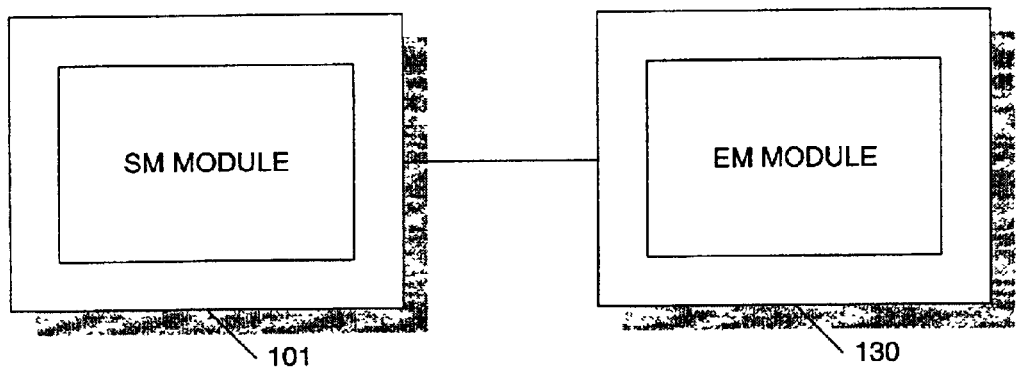
FIG. 2 shows example block diagram of client and server computer systems of FIG. 1 configured by software.

To provide secure access to data, the server computer includes a secure data storage and retrieval ("SM") module for execution on the client computer 101, and an enabling module ("EM") for execution on the server computer 130. In one or more embodiments of the invention the SM module and EM module comprise computer program code. However, the SM module and EM module may also be embodied into hardware devices configured to implement the logic of each module. Referring to FIG. 2, the SM module is downloaded from the server computer 130 to the client computer 101, and the EM module is simultaneously executed on the server computer 130 while maintaining a secure communication link between the client computer 101 and the server computer 130. The computer system 101 can include a user interface such as graphical user interface ("GUI") or user interaction, and upon execution the SM module presents command, control and information displays to a user utilizing the GUI. For example, the SM module may present command buttons to a user on a tool bar in the GUI, whereby the user can utilize a SAVE command button to achieve secure storage of a data file and a RETRIEVE command for retrieving the stored data file. As such, the execution of the SM and EM module can be virtually transparent to a user at the client computer 101.

Figure 3:
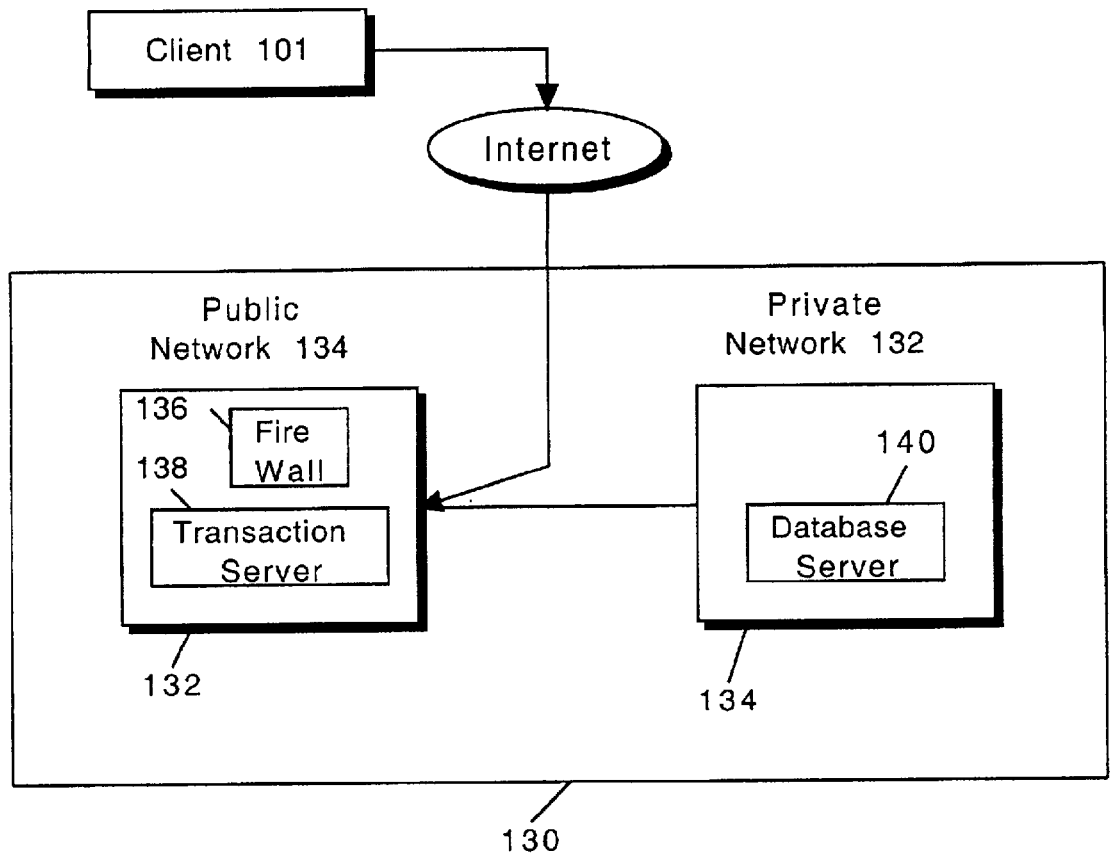
FIG. 3 shows a block diagram of an example server computer of FIG. 1.

Referring to FIG. 3, the server system 130 can comprise a private network 132 and a public network 134 connected to the Internet and to each other via a firewall system 136 for protection. The firewall and the public network prevent direct access to the private network via an Internet connection. As such, the server computer 130 permits communication with a client computer 101 only if information packets transmitted by the client system 101 complies with the security policy protocol at the server system 130.

Figure 4:
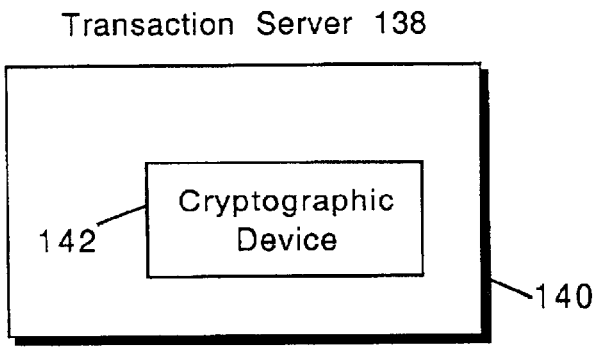
FIG. 4 shows details of an embodiment of a transaction server in the server computer of FIG. 3.

The public network comprises a transaction server 138 and the private network comprises a database server 140. The database server can only be accessed from the transaction server through the firewall. The database server is primarily used for storage of information and data files. Both the transaction server and the database server can comprise redundant backup servers to circumvent emergency interruptions in their operation. Referring to FIG. 4, a cryptographic device 142 that meets the certification requirements of Federal Information Processing Standards (FIPS) Publication 140-1 security levels for processing sensitive information can be incorporated into the transaction server 138. In one embodiment of the invention the cryptographic device is employed to generate an encode (e.g., encryption) key, a decode (e.g., decryption) key and a digital signature pertaining to a particular data file to be stored and retrieved.

Figure 5:
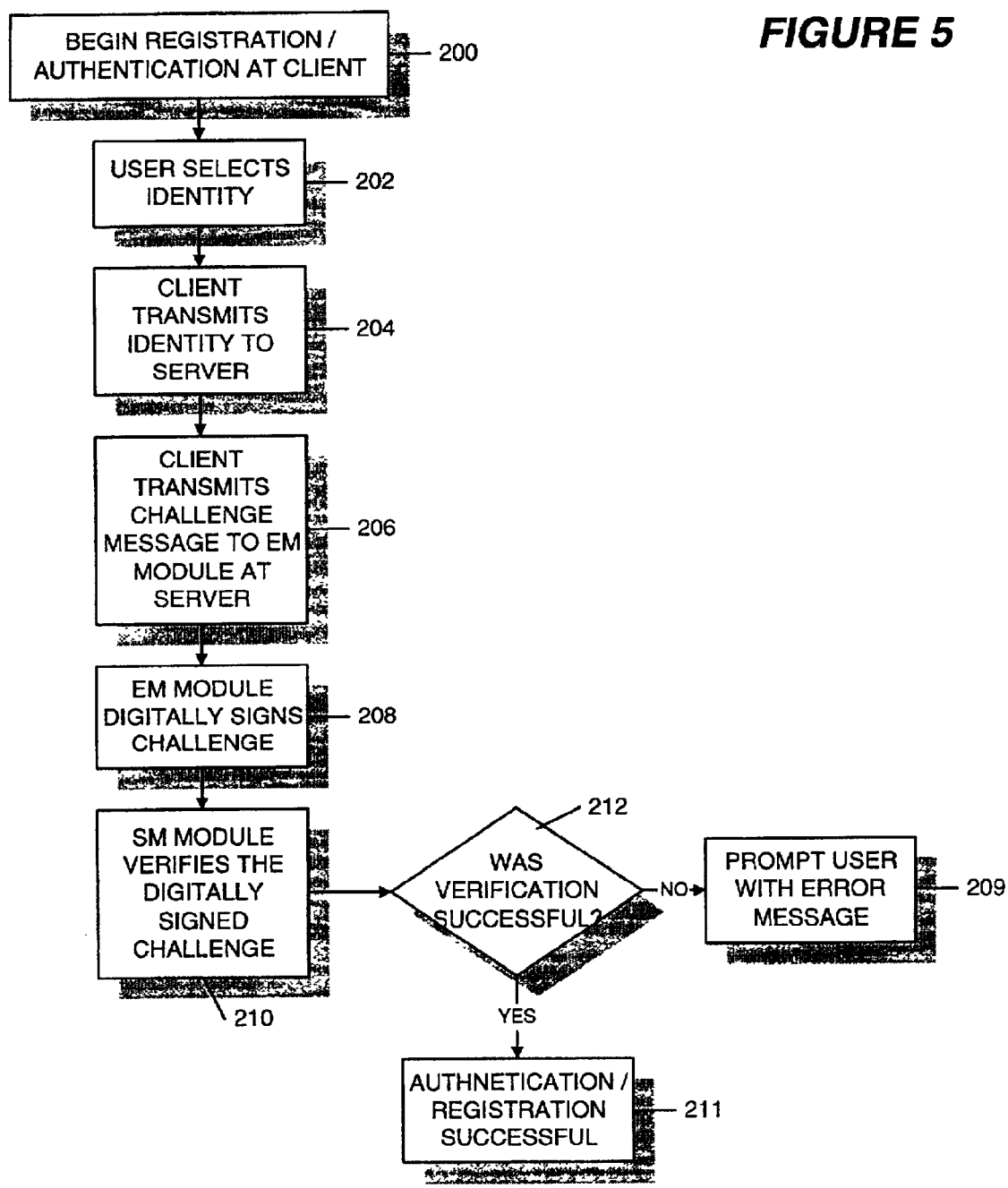
FIG. 5 shows an example flow diagram of registration/ authentication steps for secure save/retrieve operations on the system of FIG. 1 according to the present invention.

Referring to the flow diagram in FIG. 5 of an example registration/authentication process according to one embodiment of the present invention, after download and installation of the SM module in the client computer 101, the SM module prompts the user through a registration process with the computer server 130 (step 200). During the registration process the user may select and enter an identify (e.g. a password) into client computer 101 (step 202), and the client SM module transmits a message comprising the identity (password) to the EM module residing at server computer 130. In one or more embodiments of the invention the message is transmitted to the EM module in encrypted form (e.g. Data Encryption Standard (DES)). (step 204). Then the SM module transmits a message comprising a challenge (e.g. a 64-bit random number) to the EM module (step 206).

Using cryptographic device 142, the EM module digitally signs the challenge using a private key associated with the EM module software (step 208). The SM module uses a corresponding public key of EM module to verify the digital signature of the server message (step 210). If the signature is valid (step 212), then the authentication process has been successfully completed (step 211), otherwise the user is prompted with an appropriate message (step 209). A user must typically register with server 130 only once and thereafter the user can use system 100 for secure storage and retrieval of data files.

Figure 6:
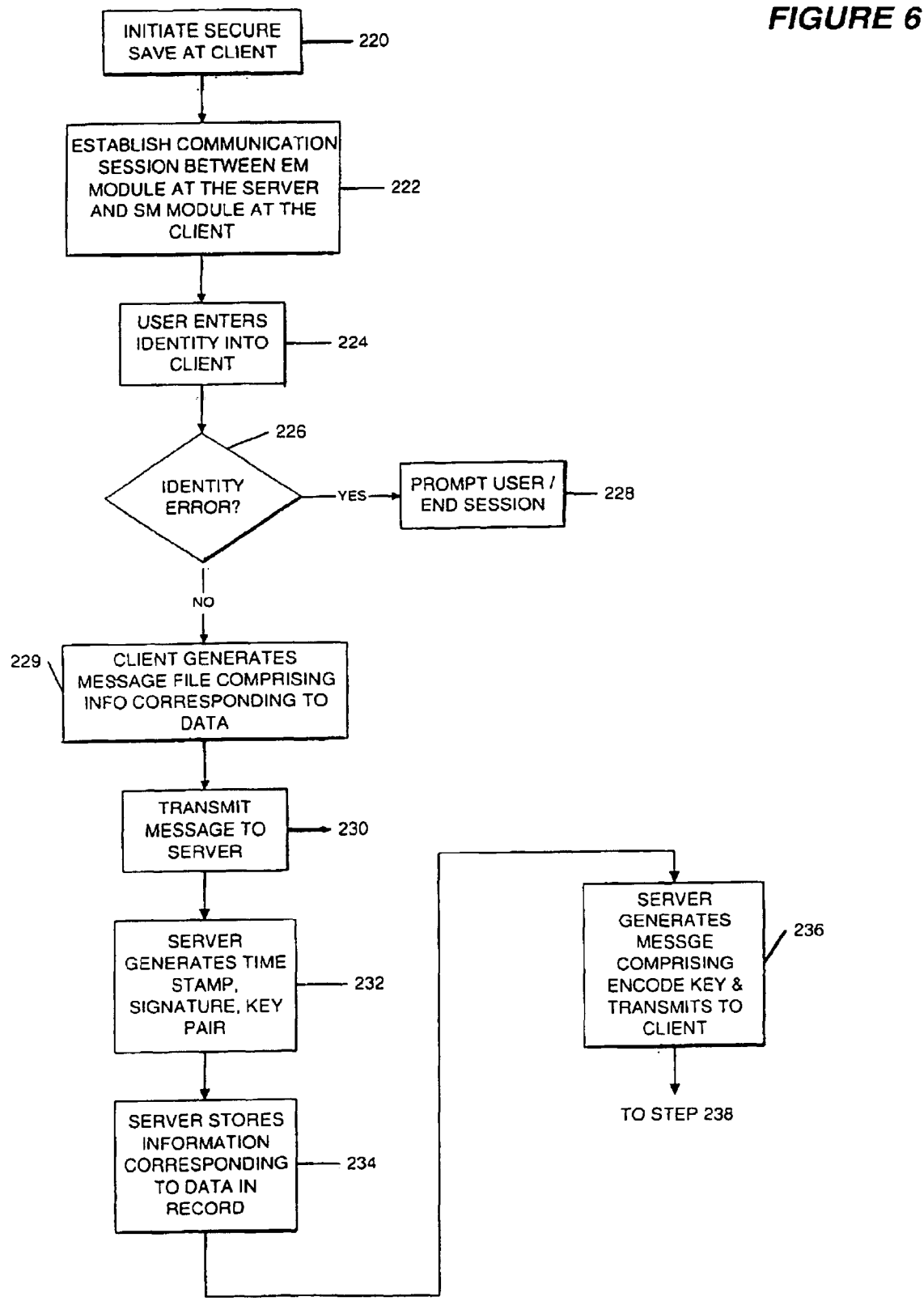
FIGS. 6–7 show an example flow diagram of an embodiment of secure save of a data file on the system of FIG. 1 according to the present invention.
Figure 7:
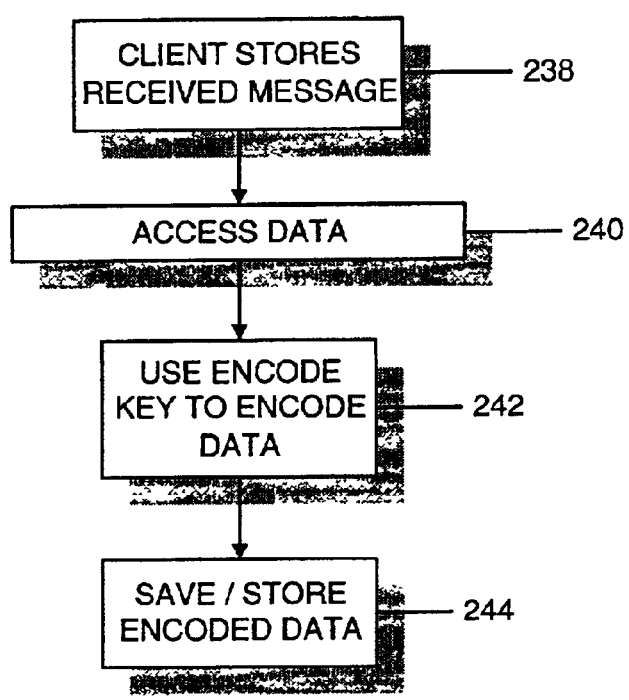

Secure Data Save Process:

Referring to the flow diagrams in FIGS. 6–7 an example secure data save process according to one embodiment of the present invention is shown. Upon successful authentication and registration, the present invention provides a mechanism to securely store a data file. The user initiates a secure save by clicking the secure SAVE command option on the toolbar created by the installation of the SM module at the client computer 101 (step 220). However, other events such as the occurrence of certain criteria (e.g. passing of time) may also imitate a secure save command. This establishes a secure communication session between the SM module in the client computer 101 and the EM module in the server computer 130 (step 222), and a query to the user for entering the user's personalized identity selected as aforementioned (step 224). If a proper identity is entered (step 226), the secure communication session begins, transparent to the user. Otherwise, if the entered identity is in error the session ends with an appropriate error message to the user (step 228).

After the secure communication link is established between the client computer 101 and the server computer 130, the SM module generates a one way hash function of the data that is to be stored. Then the SM module creates a client message file comprising the hash function, the data file name and an identification number of the SM module (step 228) and transmits the client message file to the server computer 130 (step 230). After processing the received client message file, the EM module at the server computer 130 generates a time stamp, a digital signature reflecting the digital time stamp and the hash function, and a key pair including an encryption key and a decryption key for encryption and decryption of the data file (step 232). The EM module then stores information comprising the user identification number, data file name, hash function, time stamp, digital signature, the encryption key and the decryption key as a data record in a server database (step 234). The data can be stored at server computer 130, or the data may be stored on another computer accessible via a computer network, or elsewhere. The EM module then generates a server message file including the data file name, time stamp, digital signature and the encryption key, and transmits the server message file to the client computer 101 (step 236).

Referring to the flow diagram in FIG. 7, upon receiving the server message file, the SM module at the client computer 101 saves the information in the received message file (step 238), accesses the data (step 240) and utilizes the encryption key in that message file to encrypt the data (step 242) and stores the encrypted data file along with the time stamp and the digital signature by using the file name (step 244). The encrypted data file and related information can be stored in a storage device at the client computer 101 or elsewhere in the network 100 (e.g. another computer).

Figure 8:
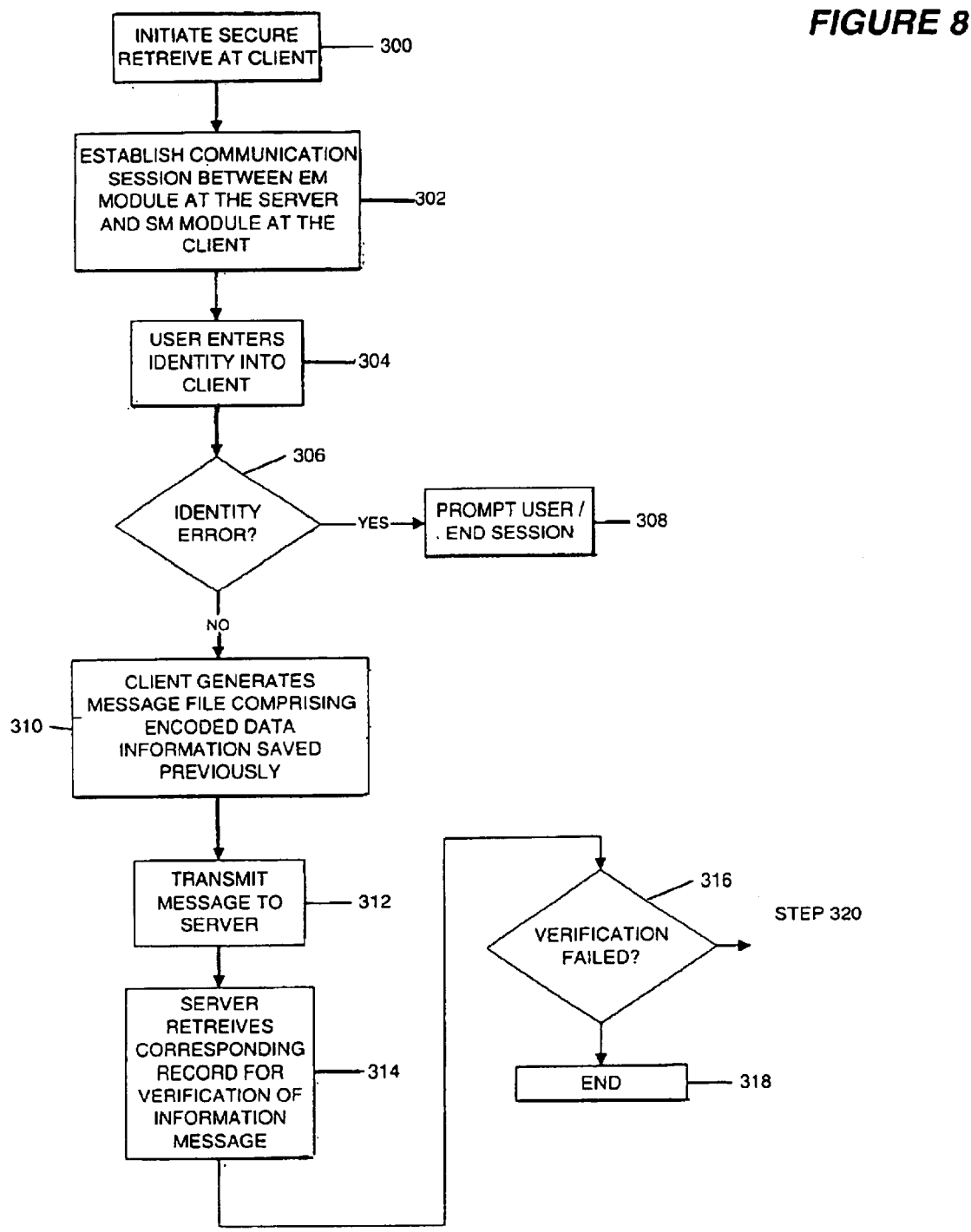
FIGS. 8–9 show an example flow diagram of an embodiment of secure retrieve of a data file on the system of FIG. 1 according to the present invention.
Figure 9:
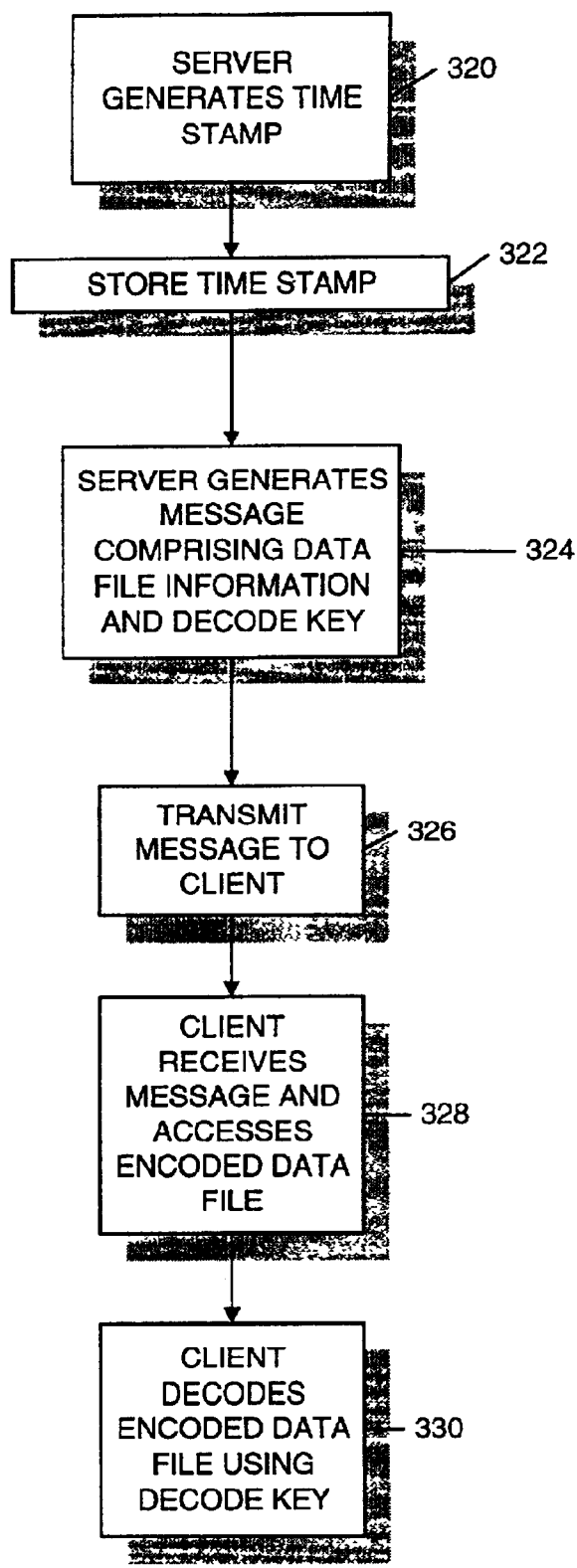

Data Retrieve Process:

Referring to flow diagrams of FIGS. 8–9 of an example secure data retrieve process according to one or more embodiments of the present invention. When the user is ready to retrieve the stored encoded data file, the user initiates a secure data retrieve by clicking the secure RETRIEVE data command button in the toolbar created by the installation of the SM module at the client computer 101 (step 300). The secure RETRIEVE may also be initiated by the occurrence of an event such as the passing of time. The secure RETRIEVE command initiates a secure communication session between the SM module residing at the client computer 101 and the EM module residing at the server computer 130 (step 302), and a query to the user for entering the user's personalized identity into the client computer 101 (step 304). The present invention also contemplates the automatic entry of personalized identity information. For example, if the user was authenticated in an earlier session the identity information from that session may be utilized. Once the proper identity is entered, the secure communication session begins, transparent to the user (step 306). Otherwise, if the entered identity is in error, the session ends with an appropriate error message to the user (step 308).

After the secure communication link is established between the client computer 101 and the server computer 100, the SM module creates a client message file comprising the data file name, the digital signature and the identification number (step 310) and transmits the client message file to server computer 140 (step 312). After processing the received client message file, the EM module retrieves the corresponding data record from the server database (step 314) for verification of the received digital signature associated with the data file name (step 316). If the verification fails, the communication terminates with an appropriate error message to the user to the user step (318).

Referring to FIG. 9, after proper verification and validation, the EM module generates a data retrieval time stamp, otherwise the EM module generates an attempted data retrieval time stamp (step 320). The EM module then stores such time information in the server database in the data record corresponding to the data file to facilitate the generation of a time history of storage and retrieval of data by the client computer 101 for subsequent audit purposes (step 322). Further, the EM module creates a server message file including the data file name and the decryption key (step 324), and transmits the server message file to the client computer 101 (step 326).

After receiving the server message file, the SM module in the client computer 101 accesses the stored encrypted data file (step 328) and uses the decryption key in the server message file to decrypt data file (step 330). The data in the data file is then ready for further use. For each storage and retrieval operation a unique key pair is used and His key pair is not used in any subsequent storage or retrieval functions.

As such, according to the present invention, data can be stored or retrieved in a secure manner by using an authentication procedure utilizing a client-server architecture. Further, the integrity of the stored data, including the time of storage of the data, can be maintained by the use of cryptography. And, a time history of storage and retrieval of data operations can be made available for subsequent auditing purposes.

Although the present invention has been described in considerable detail, other versions are possible. Therefore, the appended claims should not be limited to the descriptions of the versions contained herein.

What is claimed is:

1. In a computer system, a method for securing access to data, comprising:

generating a first message at a first computer system, said first message comprising information corresponding to data, and transmitting said first message to a second computer system;

receiving said first message at said second computer system, and generating a key pair comprising an encode key and a decode key for encoding and decoding of said data;

generating a second message comprising said encode key, and transmitting said second message to said first computer system;

receiving said second message at said first computer system, wherein said encode key in said second message is used to encode said data;

providing access to said encoded data by:

generating a third message at said first computer system, said third message comprising information identifying said encoded data, said user information, and a digital signature;

transmitting said third message to said second computer system;

receiving said third message at said second computer system;

using said information in said third message to retrieve a record corresponding to said encoded data, said record comprising said decode key for decoding said encoded data;

verifying a stored digital signature in said corresponding record with said digital signature in said third message;

upon successful verification, generating a data retrieval time stamp and storing said data retrieval time stamp;

generating a fourth message comprising said decode key, and transmitting said fourth message to said first computer system; and receiving said fourth message at said first computer system, wherein said decode key in said fourth message is utilized to decode said encoded data.

2. The method of claim 1 further comprising:

storing said key pair and said information in said first message in a database record.

3. The method of claim 1 wherein said first computer system comprises at least one client computer system and said second computer system comprises at least one server computer system.

4. The method of claim 1 wherein said generating said first message further comprises:

generating a one way hash function associated with said data; and placing said one way hash function, information identifying said data, and user information associated with a user of said data at said first computer system in said first message.

5. The method of claim 4 further comprising:

after receiving said first message at said second computer;

generating a time stamp and a first digital signature representing said digital time stamp and said one way hash function in said first message; and storing said user information, said information identifying said data, said one way hash function, said one way time stamp and said first digital signature.

6. The method of claim 5 wherein said second message further comprises:

said time stamp, said information identifying said data, and said first digital signature.

7. The method of claim 1 further comprising:

upon unsuccessful verification, generating an attempted data retrieval time stamp and storing said attempted data retrieval time stamp.

8. In a computer system, a method for providing secure real time storage and retrieval of file data comprising:

obtaining a secure save command from a user operating a screen element of a first computer system;

executing said secure save command to securely save file data at said first computer system, said executing comprising:

generating a first message at said first computer system, said first message comprising information corresponding to said file data, and transmitting said first message to a second computer system;

receiving said first message at said second computer system and generating a key pair comprising an encode key and a decode key for encoding and decoding of said file data;

generating a second message comprising said encode key and transmitting said second message to said first computer system; and receiving said second message at said first computer system, wherein said encode key in said second message is used to encode said file data;

wherein said secure save command is performed by a component of a graphical user interface presenting command buttons on a user tool bar on said first computer system.

9. The method of claim 8 wherein registration functions are performed on said second computer system while said first computer system and said second computer systems maintain a secure link to each other.

10. The method of claim 9 wherein authentication functions are performed on said second computer system while said first computer system and said second computer systems maintain a secure link to each other.

11. The method of claim 8 wherein said secure link utilizes cryptographic protocols.

12. A method of providing secure real time storage and retrieval of data comprising:

maintaining a secure link between a first computer system and a second computer system while performing registration functions on said second computer;

maintaining said secure link between said first computer system and said second computer system while performing authentication functions on said second computer system, wherein said authentication comprises obtaining an identity for said first computer system;

obtaining a secure save command from a user, wherein said secure save command is embedded into a graphical user interface of said first computer system and said user of said secure save command of said graphical user interface initiates a process comprising the steps of:

generating a first message at said first computer system, said first message comprising information corresponding to said file data and said identity, and transmitting said first message to said second computer system;

receiving said first message at said second computer system and generating an encode key for encoding said file data and generating a decode key for decoding said file data;

generating a second message comprising said encode key, and transmitting said second message to said first computer system;

receiving said second message at said first computer system, wherein said encode key in said second message is utilized to encode said file data;

accessing encoded file data by generating a third message at said first computer system, said third message comprising information corresponding to said encoded file data, and transmitting said third message to said second computer system;

receiving said third message at said second computer system, and using said information in said third message to retrieve a record corresponding to said encoded data, said record comprising said decode key for decoding said encoded data;

generating a fourth message comprising said decode key and said information corresponding to said encoded file data, and transmitting said fourth message to said first computer system;

receiving said fourth message at said first computer system, and using said decode key in said fourth message to decode said encoded file data.

13. The method of claim 12, wherein said step of generating said first message further comprises:

generating a one way hash function of said file data; and placing said hash function, information identifying said file data, and user information for a user of said file data at said first computer system in said first message.

14. The method of claim 13, further comprising:

obtaining said first message at said second computer;

generating a time stamp, and a digital signature representing said digital time stamp, and said hash function in said first message; and storing said user information, said information identifying said data, said hash function, said time stamp and said digital signature in a database record.

15. The method of claim 14 wherein said second message further comprises:

said time stamp, said information identifying said file data, and said digital signature in said second message.

16. The method of claim 12 wherein said encoded file data may be stored at a third computer system.

17. A method for providing secure storage of data, comprising:

transmitting a secure save request from a client to a server, said secure save request comprising a file name associated with a data file, an identification value associated with said client, and a one-way hash function of said data file;

generating a storage timestamp at said server;

generating a digital signature at said server based on said storage timestamp and said one-way hash function;

generating, at said server, a first encryption key for encoding and a second encryption key for decoding;

storing said file name, said identification value, said storage timestamp, said digital signature and said second encryption key in a database record;

transmitting a secure save response from said server to said client, said secure save response comprising said file name, said digital signature, and said first encryption key;

using said first encryption key and said data file to obtain encrypted data at said client; and storing said encrypted data and said digital signature in association with said file name.

18. The method of claim 17, further comprising:

transmitting a secure retrieve request from said client to said server, said secure retrieve request comprising said file name, said identification value and said digital signature;

said server comparing said file name, said identification value and said digital signature from said secure retrieval request with said file name, said identification value and said digital signature from said database record;

when said comparing is a match,
generating a retrieval success timestamp and storing said retrieval success timestamp in said database record;
transmitting a secure retrieval response from said server to said client, said secure retrieval response comprising said file name and said second encryption key; and
said client using said second encryption key to decode said encrypted data.

19. The method of claim 18, further comprising, when said comparing is not a match:

generating a retrieval attempt timestamp; and storing said retrieval attempt timestamp in said database record.

20. The method of claim 18, further comprising:

said client auditing said database record to obtain an access history comprising said storage timestamp and said retrieval success timestamp.

21. The method of claim 17, further comprising:

transmitting a second secure save request from said client to said server, said second secure save request comprising said file name;

said server generating a third encryption key for encoding and a fourth encryption key for decoding, wherein said third encryption key and said fourth encryption key differ from said first encryption ey and said second encryption key, respectively.

* * * * *